(12) United States Patent
Narita et al.

(10) Patent No.: US 11,199,275 B2
(45) Date of Patent: Dec. 14, 2021

(54) SPOOL VALVE

(71) Applicant: KAWASAKI JUKOGYO KABUSHIKI KAISHA, Kobe (JP)

(72) Inventors: Shinji Narita, Akashi (JP); Hideki Tanaka, Nishinomiya (JP); Tadashi Anada, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/960,986

(22) PCT Filed: Dec. 28, 2018

(86) PCT No.: PCT/JP2018/048549
§ 371 (c)(1),
(2) Date: Jul. 9, 2020

(87) PCT Pub. No.: WO2019/138945
PCT Pub. Date: Jul. 18, 2019

(65) Prior Publication Data
US 2020/0347953 A1 Nov. 5, 2020

(30) Foreign Application Priority Data
Jan. 12, 2018 (JP) .............................. JP2018-003734

(51) Int. Cl.
*F16K 31/04* (2006.01)
*F16K 31/50* (2006.01)
(Continued)

(52) U.S. Cl.
CPC .............. *F16K 31/047* (2013.01); *F16K 3/24* (2013.01); *F16K 11/07* (2013.01); *F16K 31/04* (2013.01); *F16K 31/508* (2013.01)

(58) Field of Classification Search
CPC .......... F16K 31/047; F16K 31/04; F16K 3/24; F16K 11/07; F16K 31/508
See application file for complete search history.

(56) References Cited

U.S. PATENT DOCUMENTS

| 5,715,867 A | 2/1998 | Dore et al. | |
|---|---|---|---|
| 2004/0238051 A1* | 12/2004 | Tranovich | F15B 20/004 137/625.65 |
| 2017/0211699 A1* | 7/2017 | Sasanuma | F16K 31/04 |

FOREIGN PATENT DOCUMENTS

| CN | 102278516 A | 12/2011 |
|---|---|---|
| JP | H08-510034 A | 10/1996 |

(Continued)

*Primary Examiner* — Jessica Cahill
*Assistant Examiner* — Patrick C Williams
(74) *Attorney, Agent, or Firm* — Oliff PLC (57) ABSTRACT

A spool valve includes: a housing including a spool hole; a spool inserted into the spool hole of the housing so as to be movable in an axial direction; a screw shaft arranged coaxially with the spool; an electric motor configured to rotate the screw shaft; a nut threadedly engaged with the screw shaft and configured to move in the axial direction when the screw shaft is rotated; a coupler through which the nut and the spool are coupled to each other; and a coil spring configured to apply biasing force to the spool, the biasing force acting so as to maintain the spool at a neutral position, the coil spring being arranged so as to overlap the nut when viewed from a radial direction of the screw shaft.

13 Claims, 4 Drawing Sheets

(51) Int. Cl.
*F16K 3/24* (2006.01)
*F16K 11/07* (2006.01)

(56) References Cited

FOREIGN PATENT DOCUMENTS

| | | |
|---|---|---|
| JP | 2011-190920 A | 9/2011 |
| JP | 2014-173711 A | 9/2014 |
| JP | 5666174 B2 | 2/2015 |
| JP | 2017-040294 A | 2/2017 |
| JP | 2017-133641 A | 8/2017 |

* cited by examiner

SPOOL VALVE

TECHNICAL FIELD

The present invention relates to a spool valve configured to move a spool by an electric actuator.

BACKGROUND ART

A spool valve is known as one of control valves used in liquid-pressure circuits. The spool valve can control a flow direction of operating oil and a flow rate of the operating oil in accordance with the position of a spool. Further, as the spool valve, a pilot drive spool valve configured to apply pilot pressure to the spool to change the position of the spool and an actuator drive spool valve configured to change the position of the spool by a linear-motion electric actuator are known. One example of the actuator drive spool valve is a multiple direction switching valve of PTL 1.

In the multiple direction switching valve of PTL 1, an output shaft of an electric motor is coupled to the spool through a ball screw reduction gear. The ball screw reduction gear includes: a screw shaft attached to the output shaft of the electric motor; and a nut threadedly engaged with the screw shaft through balls. Rotation of the nut is prevented by subjecting a power transmitting member, fixed to the nut, to a rotation preventing process. With this, a rotational motion of the screw shaft is converted into a linear motion of the nut. The nut is coupled to the spool through the power transmitting member. When the output shaft of the electric motor rotates, the spool moves in an axial direction of the spool. Thus, the position of the spool changes. Further, the multiple direction switching valve includes a neutral return mechanism configured to, when, for example, an electric power system of the electric motor is cut off, return the spool to a neutral position. The neutral return mechanism includes a coil spring arranged between the nut of the ball screw reduction gear and the spool. When the spool moves from the neutral position, the coil spring returns the spool to the neutral position.

CITATION LIST

Patent Literature

PTL 1: Japanese Patent No. 5666174

SUMMARY OF INVENTION

Technical Problem

In the multiple direction switching valve of PTL 1, the spool, the coil spring, and the nut of the ball screw reduction gear are arranged so as to be lined up in the axial direction of the spool. Therefore, an entire length of the spool valve is long.

An object of the present invention is to provide a spool valve which can be reduced in length in an axial direction of the spool valve.

Solution to Problem

To solve the above problems, a spool valve according to the present invention includes: a housing including a spool hole; a spool inserted into the spool hole of the housing so as to be movable in an axial direction; a screw shaft arranged coaxially with the spool; an electric motor configured to rotate the screw shaft; a nut threadedly engaged with the screw shaft and configured to move in the axial direction when the screw shaft is rotated; a coupler through which the nut and the spool are coupled to each other; and a coil spring configured to apply biasing force to the spool, the biasing force acting so as to maintain the spool at a neutral position, the coil spring being arranged so as to overlap the nut when viewed from a radial direction of the screw shaft.

According to the above configuration, the coil spring is arranged so as to overlap the nut when viewed from the radial direction of the screw shaft. Therefore, the length of the spool valve in the axial direction can be made shorter than that of a conventional spool valve in which the coil spring and the nut are lined up in the axial direction.

The above spool valve may further include a casing accommodating the coil spring and the nut, and the coupler may include a projecting portion projecting from the casing and connected to the spool. According to this configuration, the electric motor and the casing accommodating the coil spring and the nut are formed as an assembly, and then, the spool can be attached to the coupler.

In the above spool valve, the casing may be integrally formed and be configured to hold the coil spring therein. According to this configuration, the casing is integrally formed and configured to hold the coil spring. Therefore, for example, when replacing the spool with a new spool, the spool valve is easily assembled.

The above spool valve may be configured such that: the coil spring includes a first spring piece and a second spring piece; the first spring piece is compressed when the spool moves from the neutral position to a first side in the axial direction; and the second spring piece is compressed when the spool moves from the neutral position to a second side in the axial direction. According to this configuration, when the spool moves from the neutral position, the first spring piece or the second spring piece is compressed. Therefore, durability of each spring piece can be improved.

Or, in the above spool valve, the coil spring may be compressed when the spool moves from the neutral position to each of first and second sides in the axial direction. According to this configuration, the length of the spool valve in the axial direction can be made shorter than that of a case where the coil spring includes the above-described first and second spring pieces.

Advantageous Effects of Invention

The present invention can provide the spool valve which can be reduced in length in the axial direction.

DESCRIPTION OF EMBODIMENTS

Embodiment 1

Hereinafter, a spool valve 1A according to Embodiment 1 of the present invention will be described with reference to FIGS. 1, 2A, and 2B.

An industrial machine, such as a construction machine, includes a hydraulic supply device configured to supply operating oil to an actuator. The actuator is configured to drive at a speed corresponding to a flow rate of the operating oil supplied to the actuator. The hydraulic supply device includes the spool valve 1A shown in FIG. 1 and configured to control the flow rate of the operating oil supplied to the actuator. The spool valve 1A includes a linear-motion electric spool valve and includes a housing 11, a spool 12, a linear-motion converting unit 13, and an electric motor 14. The spool 12 is formed in a substantially columnar shape and extends in its axial direction.

Hereinafter, for convenience of explanation, a direction from the spool 12 toward the electric motor 14, i.e., a first side (i.e., a right side in FIG. 1) in the axial direction of the spool 12 is referred to as a "right side." A direction from the electric motor 14 toward the spool 12, i.e., a left side (i.e., a left side in FIG. 1) of the spool 12 is referred to as a "left side." Further, the "axial direction" denotes the axial direction (i.e., a left-right direction in FIG. 1) of the spool 12. The same is true in the explanation of a spool valve 1B according to Modified Example described below.

The housing 11 is, for example, a valve block and includes a spool hole 11a and a plurality of oil passages (in the present embodiment, three oil passages) 11b to 11d. The spool hole 11a extends in a predetermined direction so as to penetrate the housing. The three oil passages 11b to 11d are connected to the spool hole 11a at different positions. The three oil passages 11b to 11d are connected to a hydraulic pump, an actuator, and/or the like (not shown), and the operating oil flows through the three oil passages 11b to 11d. The spool 12 is inserted into the spool hole 11a of the housing 11 configured as above.

The spool 12 includes a spool main body portion 12a and a flat plate portion 12b projecting from one end portion of the spool main body portion 12a. The spool main body portion 12a is formed in a substantially columnar shape and extends in its axial direction. An outer diameter of the spool main body portion 12a is substantially equal to a hole diameter of the spool hole 11a. A plurality of circumferential grooves (in the present embodiment, two circumferential grooves 12c and 12d) are formed on an outer peripheral surface of the spool main body portion 12a. The circumferential grooves 12c and 12d extend on the outer peripheral surface of the spool main body portion 12a over the entire periphery in the circumferential direction. The circumferential grooves 12c and 12d are arranged so as to correspond to the three oil passages 11b to 11d when the spool 12 is being inserted into the spool hole 11a.

Figure 1:
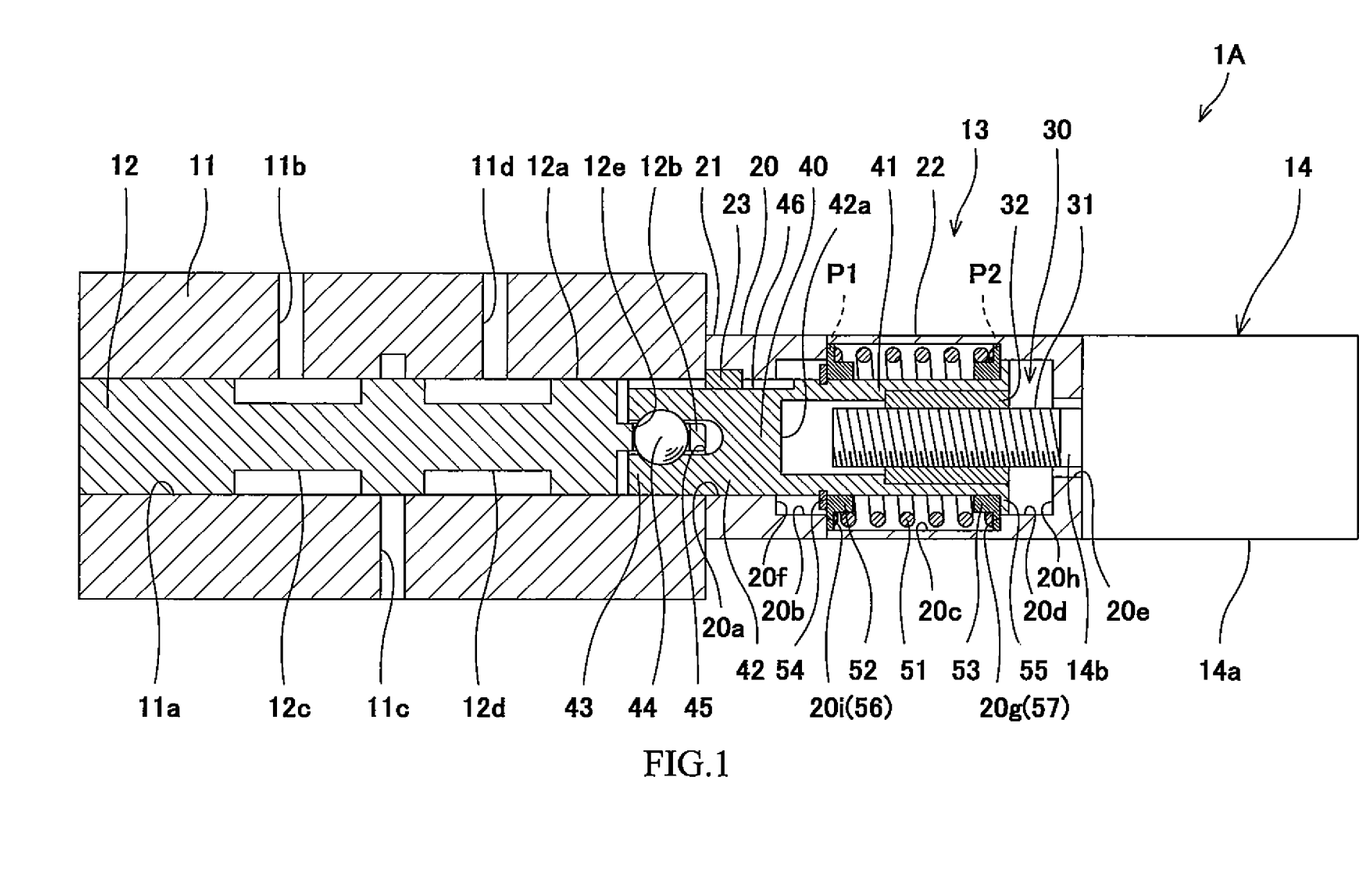
FIG. 1 is a sectional view showing a spool valve according to Embodiment 1 of the present invention.

For example, when the spool 12 is located at a neutral position as shown in FIG. 1, the two circumferential grooves 12c and 12d are respectively connected to the first and third oil passages 11b and 11d formed at positions away from each other in the axial direction. When the spool 12 moves to the right side, the first circumferential groove 12c located at the left side connects the first oil passage 11b and the second oil passage 11c. When the spool 12 moves to the left side, the second circumferential groove 12d located at the right side connects the third oil passage 11d and the second oil passage 11c.

As above, by changing the position of the spool 12, the spool 12 can change connection statuses among the three oil passages 11b to 11d and also adjust opening degrees among the connected oil passages 11b to 11d. To be specific, the spool 12 can make the operating oil flow in a direction corresponding to the position of the spool 12 at a flow rate corresponding to the position of the spool 12.

The flat plate portion 12b is formed in a substantially flat plate shape and projects from a right end portion of the spool main body portion 12a toward the right side. The flat plate portion 12b is formed so as to be connectable with a below-described coupler 40. Specifically, a fitting hole 12e is formed in the vicinity of a middle of the flat plate portion 12b. The fitting hole 12e penetrates the flat plate portion 12b in a thickness direction (an upper-lower direction on the paper surface in FIG. 1) of the flat plate portion 12b. A ball 44 having a substantially spherical shape is fitted in the fitting hole 12e. The spool 12 is connected to the coupler 40 through the ball 44. Details of the connection of the flat plate portion 12b with the coupler 40 will be described later.

The linear-motion converting unit 13 is arranged at the right side of the housing 11 and the spool 12, and the electric motor 14 is arranged at the right side of the linear-motion converting unit 13. The linear-motion converting unit 13 includes a casing 20, a linear-motion converting mechanism 30, the coupler 40, and a neutral return mechanism 50.

The casing 20 has a substantially cylindrical shape and includes opening portions at respective right-side and left-side end portions thereof. The casing 20 includes a first casing piece 21 and a second casing piece 22 which are formed by dividing the casing 20 in the axial direction of the spool 12 at a section perpendicular to the axial direction of the spool 12.

The first casing piece 21 and the second casing piece 22 are lined up in the axial direction of the spool 12 in this order from a side close to the spool 12 and are coupled to each other. The first casing piece 21 has a substantially cylindrical shape and includes an inner peripheral surface 20a and an inner peripheral surface 20b which are lined up in this order from a side close to the spool 12. The inner peripheral surface 20a is substantially equal in diameter to the spool hole 11a, and the inner peripheral surface 20b is larger in diameter than the inner peripheral surface 20a (regarding the "inner peripheral surfaces" and below-described "step portions," see also FIGS. 2A and 2B). The second casing piece 22 has a substantially cylindrical shape and includes an inner peripheral surface 20c, an inner peripheral surface 20d, and an inner peripheral surface 20e which are lined up in this order from a side close to the spool 12. The inner peripheral surface 20c is larger in diameter than the inner peripheral surface 20b of the first casing piece 21. The inner peripheral surface 20d is equal in diameter to the inner peripheral surface 20b of the first casing piece 21. The inner peripheral surface 20e is smaller in diameter than the spool hole 11a. A step portion 20f is formed between the inner peripheral surfaces 20a and 20b of the first casing piece 21. A step portion 20g is formed between the inner peripheral surfaces 20c and 20d of the second casing piece 22. A step portion 20h is formed between the inner peripheral surfaces 20d and 20e of the second casing piece 22.

The casing 20 is integrally formed in such a manner that a right-side opening end portion of the first casing piece 21 and a left-side opening end portion of the second casing piece 22 are made to face each other and are joined to each other by mechanical fastening, welding, adhesion, or the like. To be specific, the linear-motion converting unit 13 is configured as a single unit by integrally forming the casing 20 such that components of the linear-motion converting mechanism 30 and components of the neutral return mechanism 50 are held inside the casing 20. It should be noted that by joining the first casing piece 21 and the second casing piece 22 to each other, a step portion 20i is formed between the inner peripheral surface 20b of the first casing piece 21 and the inner peripheral surface 20c of the second casing piece 22 in the casing 20.

A left-side end surface of the casing 20 is brought into contact with a right-side end surface of the housing 11 such that central axes of the inner peripheral surfaces 20a to 20e and a central axis of the spool hole 11a of the housing 11 coincide with each other. In this state, the casing 20 is fastened to the housing 11. The electric motor 14 is attached to a right-side end surface of the casing 20.

The electric motor 14 is a so-called servomotor and includes a stator 14a and a rotor (including an output shaft) 14b. A controller (not shown) is connected to the stator 14a. The rotor 14b rotates in accordance with a voltage applied from the controller. The rotor 14b is arranged coaxially with the spool 12 and projects in the axial direction from the stator 14a toward an inside of the casing 20 so as to be inserted into the opening portion of the right-side end portion of the casing 20. The linear-motion converting mechanism 30 is provided at a tip end of the rotor 14b (i.e., a left end of the rotor 14b in FIG. 1).

The linear-motion converting mechanism 30 is a mechanism configured to convert a rotational motion of the rotor 14b of the electric motor 14 into a linear motion. In the present embodiment, the linear-motion converting mechanism 30 is a ball screw mechanism and includes a screw shaft 31 and a nut 32. The screw shaft 31 is a rod-shaped member extending in the axial direction, and an external thread is formed on an outer peripheral surface of the screw shaft 31. The screw shaft 31 is arranged coaxially with the spool 12. The screw shaft 31 is attached to the rotor 14b and rotates about an axis integrally with the rotor 14b. The nut 32 is threadedly engaged with the screw shaft 31 through a large number of balls (not shown). The nut 32 is fixed to the coupler 40. The coupler 40 is prevented from rotating about the axis of the spool 12 relative to the casing 20 in such a manner that as described below, a protruding portion 23 of the casing 20 is fitted in a guide groove 46 of the coupler 40. To be specific, the nut 32 fixed to the coupler 40 is also prevented from rotating about the axis of the spool 12 relative to the casing 20. Therefore, when the screw shaft 31 is rotated, the nut 32 does not rotate about the axis of the screw shaft 31 but moves along the screw shaft 31 in the left-right direction.

The coupler 40 is a member configured to couple the nut 32 and the spool 12 to each other. The coupler 40 is formed in a substantially bottomed tubular shape and extends in its axial direction. An outer diameter of the coupler 40 is substantially equal to the diameter of the inner peripheral surface 20a of the casing 20 and the diameter of the spool hole 11a. The coupler 40 includes a tubular portion 41 and a columnar portion 42. The tubular portion 41 constitutes a right-side portion of the coupler 40, and the columnar portion 42 constitutes a left-side portion of the coupler 40. The tubular portion 41 is open toward the right side, and a left side of the tubular portion 41 is closed by the columnar portion 42. The tubular portion 41 is arranged such that a central axis thereof coincides with an axis of the spool 12.

The screw shaft 31 is inserted into an opening portion of the tubular portion 41 from the right side, and the nut 32 threadedly engaged with the screw shaft 31 is fitted in and adhered to an inner peripheral surface 41a of the tubular portion 41. The coupler 40 configured as above can move in the left-right direction together with the nut 32. A surface (i.e., a right-side end surface of the columnar portion 42) 42a that closes the tubular portion 41 from a left end side and a left end portion of the screw shaft 31 are arranged with a predetermined interval so as not to contact each other when the nut 32 moves to the right side relative to the screw shaft 31.

The coupler 40 includes a projecting portion 43 which projects from the casing 20 toward the left side at least when the spool 12 is located at the neutral position. In the present embodiment, the projecting portion 43 is a part of the columnar portion 42 of the coupler. However, the projecting portion 43 may be formed so as to include the entire columnar portion 42 and a part of the tubular portion. The projecting portion 43 is inserted into the spool hole 11a of the housing 11. The projecting portion 43 is formed so as to be connectable with the spool 12. In the present embodiment, the projecting portion 43 of the coupler 40 and the flat plate portion 12b of the spool 12 are connected to each other such that to allow misalignment of the spool 12 with respect to the nut 32, the spool 12 can incline and slide relative to the nut 32 in all directions perpendicular to the axial direction. More specifically, the projecting portion 43 of the coupler 40 is connected to the flat plate portion 12b through the ball 44 fitted in the fitting hole 12e of the flat plate portion 12b. To be specific, the projecting portion 43 of the coupler 40, the flat plate portion 12b of the spool 12, and the ball 44 constitute a ball joint.

An insertion groove 45 is formed at a tip end of the projecting portion 43 of the coupler 40. The flat plate portion 12b having a substantially flat plate shape is inserted into the insertion groove 45. The insertion groove 45 is formed so as to penetrate the coupler 40 in a perpendicular direction perpendicular to the axial direction (i.e., a direction perpendicular to the paper surface of FIG. 1). To be specific, a section of the projecting portion 43 which section is vertical to the perpendicular direction has a substantially U shape.

The insertion groove 45 is formed such that a part thereof corresponding to the fitting hole 12e is curved (recessed) outward in a width direction of the insertion groove 45 in accordance with the shape of the ball 44. The ball 44 is fitted in this part of the insertion groove 45. To be specific, the flat plate portion 12b can be inserted into the insertion groove 45 with the ball 44 fitted in the fitting hole 12e, and the projecting portion 43 of the coupler 40 and the flat plate portion 12b of the spool 12 are engaged with each other by the ball 44. With this, the nut 32 and the spool 12 are coupled to each other by the coupler 40. When the nut 32 moves in the axial direction, the spool 12 can move in the left-right direction in conjunction with the nut 32. As above, the linear-motion converting unit 13 and the electric motor 14 constitute a linear-motion electric actuator configured to make the spool 12 reciprocate in the axial direction by the supply of the electric power to the electric motor 14.

In the present embodiment, as described above, the projecting portion 43 of the coupler 40 and the flat plate portion 12b of the spool 12 are connected to each other through the ball 44. Therefore, when the axis of the spool 12 inclines relative to the axis of the rotor 14b, i.e., the misalignment occurs, the flat plate portion 12b of the spool 12 can incline relative to the projecting portion 43 of the coupler 40 in any direction in accordance with the inclination of the axis of the spool 12. With this, the inclination of the axis of the spool 12 relative to the axis of the rotor 14b is allowable.

The protruding portion 23 is provided on the inner peripheral surface 20a of the casing 20. The protruding portion 23 is located at a predetermined portion in a circumferential direction and projects inward in the radial direction. The guide groove 46 is formed on an outer peripheral surface of the coupler 40. The guide groove 46 extends in the axial direction from a position opposed to the protruding portion 23 in the radial direction. The protruding portion 23 is fitted in the guide groove 46. When the coupler 40 moves in the axial direction, the protruding portion 23 is guided by the guide groove 46 in the axial direction. Further, since the protruding portion 23 is fitted in the guide groove 46, the coupler 40 is prevented from rotating about the axis of the spool 12 relative to the casing 20.

The neutral return mechanism 50 is a mechanism configured to apply biasing force, by which the spool 12 is maintained at the neutral position, to the spool 12 to return the spool 12 to the neutral position when, for example, an electric power system of the electric motor 14 is cut off. The neutral return mechanism 50 includes a coil spring 51, a first spring receiving member 52, a second spring receiving member 53, a first pushing portion 54, a second pushing portion 55, a first restricting portion 56, and a second restricting portion 57. The first spring receiving member 52, the second spring receiving member 53, and the coil spring 51 are externally attached to the coupler 40.

Figure 2A:
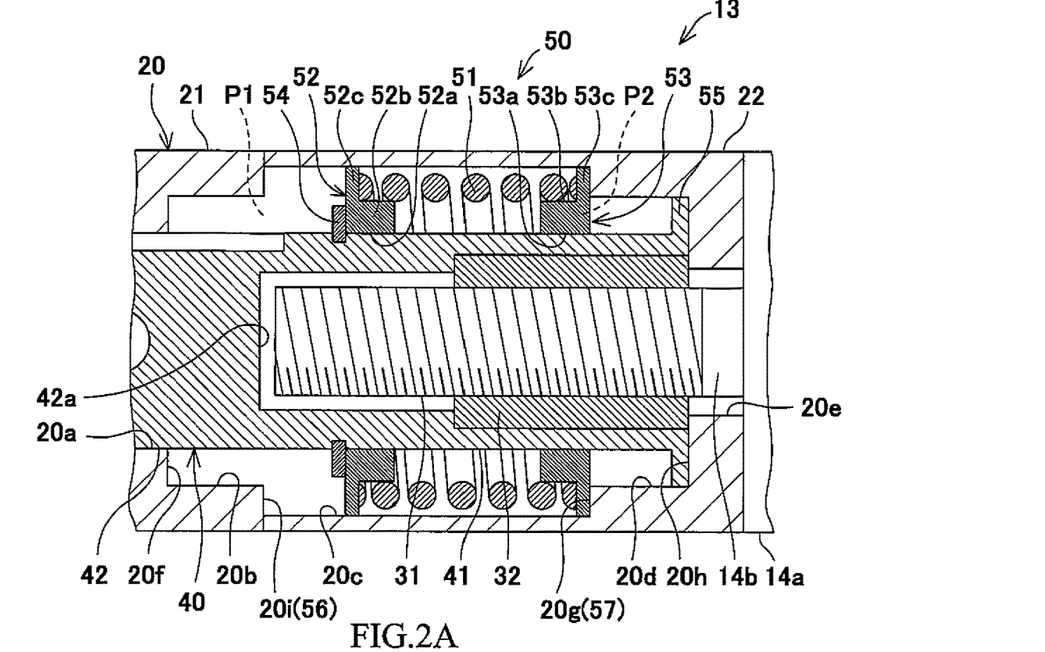
FIG. 2A is an enlarged sectional view of a neutral return mechanism of the spool valve shown in FIG. 1 and is a diagram showing that a spool has moved to a first side in an axial direction.

FIG. 2A is an enlarged sectional view showing a state of the neutral return mechanism 50 when the spool 12 has moved to the right side. FIG. 2B is an enlarged sectional view showing a state of the neutral return mechanism 50 when the spool 12 has moved to the left side. Hereinafter, the neutral return mechanism 50 will be described suitably with reference to FIGS. 2A and 2B.

The coil spring 51 is arranged around the coupler 40 (more specifically, the tubular portion 41) so as to overlap the nut 32 when viewed from the radial direction of the screw shaft 31. Then, the first spring receiving member 52 and the second spring receiving member 53 are arranged so as to sandwich the coil spring 51 in the axial direction. To be specific, in the present embodiment, the linear-motion converting mechanism 30 is arranged at a radially inner side of the tubular portion 41 of the coupler 40, and the neutral return mechanism 50 is arranged at a radially outer side of the tubular portion 41 of the coupler 40. The coil spring 51 is a so-called compression coil spring and is interposed between the two spring receiving members 52 and 53 in a compressed state.

Figure 2B:
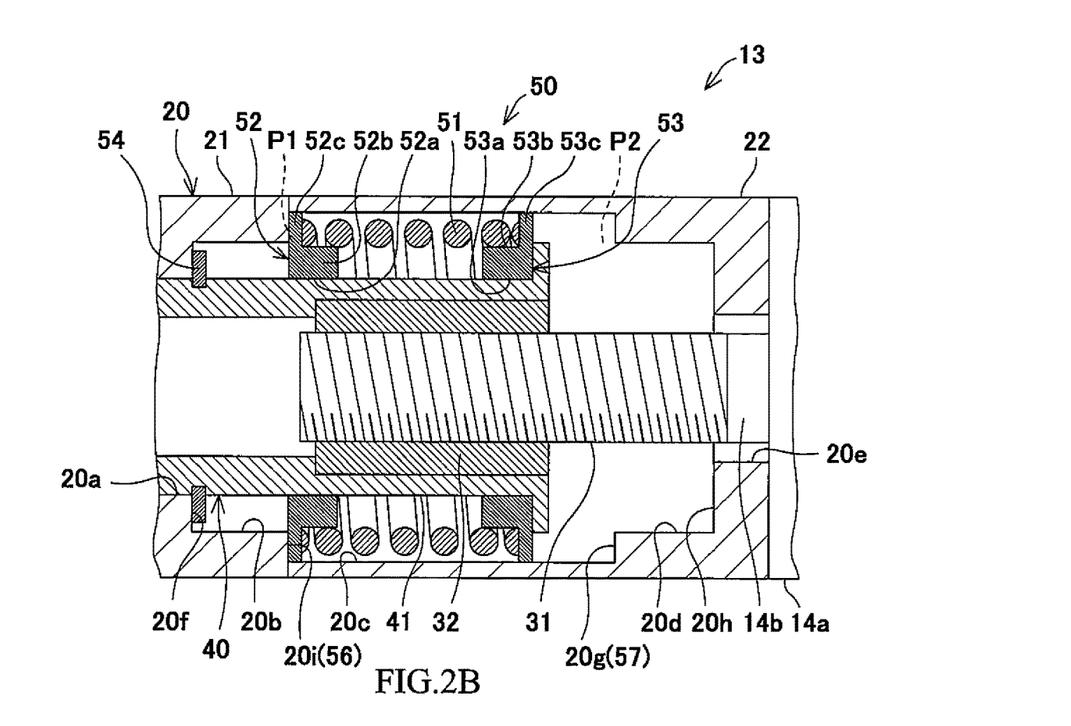
FIG. 2B is an enlarged sectional view showing the neutral return mechanism of the spool valve shown in FIG. 1 and is a diagram showing that the spool has moved to a second side in the axial direction.

As shown in FIGS. 2A and 2B, the first spring receiving member 52 includes a tubular portion 52b and a flange portion 52c. The tubular portion 52b includes an insertion hole 52a into which the coupler 40 is inserted in the axial direction. The flange portion 52c is formed at the left side of the tubular portion 52b. The tubular portion 52b is located at a radially inner side of the coil spring 51, and the flange portion 52c receives a left end portion of the coil spring 51. The coupler 40 is inserted into the insertion hole 52a, and with this, the first spring receiving member 52 is movable (slidable) relative to the coupler 40 in the axial direction.

As shown in FIG. 1, when the spool 12 is located at the neutral position, the first spring receiving member 52 is located at a first position P1 that is a position at which the first spring receiving member 52 contacts the step portion 20i in the casing 20. The first pushing portion 54 is provided at the left side of the first spring receiving member 52. The first spring receiving member 52 is pushed by the first pushing portion 54 from the left side, and with this, moves to the right side of the first position P1 (see FIG. 2A).

In the present embodiment, the first pushing portion 54 is provided so as to project outward in the radial direction from the outer peripheral surface of the coupler 40. The first pushing portion 54 is formed separately from the coupler 40 and fixed to the coupler 40. The first pushing portion 54 moves integrally with the coupler 40 in the axial direction. When the spool 12 is located at the neutral position, the first pushing portion 54 is located at such a position as to contact the first spring receiving member 52, located at the first position P1, from an opposite side of the coil spring 51. When the spool 12 moves from the neutral position to the right side, the first pushing portion 54 moves to the right side together with the spool 12 and pushes the first spring receiving member 52 (see FIG. 2A).

As shown in FIGS. 2A and 2B, the second spring receiving member 53 includes a tubular portion 53b and a flange portion 53c. The tubular portion 53b includes an insertion hole 53a into which the coupler 40 is inserted in the axial direction. The flange portion 53c is formed at the right side of the tubular portion 53b. The tubular portion 53b is located at a radially inner side of the coil spring 51, and the flange portion 53c receives a right end portion of the coil spring 51. The coupler 40 is inserted into the insertion hole 53a, and with this, the second spring receiving member 53 is movable (slidable) relative to the coupler 40 in the axial direction.

As shown in FIG. 1, when the spool 12 is located at the neutral position, the second spring receiving member 53 is located at a second position P2 that is a position at which the second spring receiving member 53 contacts the step portion 20g in the casing 20. The second pushing portion 55 is provided at the right side of the second spring receiving member 53. The second spring receiving member 53 is pushed by the second pushing portion 55 from the right side, and with this, moves to the left side of the second position P2 (see FIG. 2B).

In the present embodiment, an opening end portion of the coupler 40 (more specifically, the tubular portion 41) is formed in a flange shape that projects outward in the radial direction from the outer peripheral surface of the coupler 40, and this flange portion constitutes the second pushing portion 55. To be specific, the second pushing portion 55 is a part of the coupler 40. When the spool 12 is located at the neutral position, the second pushing portion 55 is located at such a position as to contact the second spring receiving member 53, located at the second position P2, from an opposite side of the coil spring 51. When the spool 12 moves from the neutral position toward the left side, the second pushing portion 55 moves to the left side together with the spool 12 and pushes the second spring receiving member 53 (see FIG. 2B).

The movement of the first spring receiving member 52 to the left side of the first position P1 is restricted by the first restricting portion 56 (see FIGS. 1 and 2B). Further, the movement of the second spring receiving member 53 to the right side of the second position P2 is restricted by the second restricting portion 57 (see FIGS. 1 and 2A). In the present embodiment, a radially outer end edge of the first spring receiving member 52 (more specifically, the flange portion 52c) is located between the inner peripheral surface 20c and the inner peripheral surface 20b in the radial direction, the inner peripheral surface 20b being smaller in diameter than the inner peripheral surface 20c. Further, a radially outer end edge of the second spring receiving member 53 (more specifically, the flange portion 53c) is located between the inner peripheral surface 20c and the inner peripheral surface 20d in the radial direction, the inner peripheral surface 20d being smaller in diameter than the inner peripheral surface 20c. Therefore, the first spring receiving member 52 and the second spring receiving member 53 are movable only within a range in which the inner peripheral surface 20c extends in the axial direction.

To be specific, the step portion 20i between the inner peripheral surfaces 20b and 20c serves as the first restricting portion 56 configured to restrict the movement of the first spring receiving member 52 to the left side of the first position P1. The step portion 20g between the inner peripheral surfaces 20c and 20d serves as the second restricting portion 57 configured to restrict the movement of the second spring receiving member 53 to the right side of the second position P2. In other words, when the first spring receiving member 52 is located at the first position P1, the first spring receiving member 52 contacts and is supported by the first restricting portion 56. Further, when the second spring receiving member 53 is located at the second position P2, the second spring receiving member 53 contacts and is supported by the second restricting portion 57.

According to the neutral return mechanism 50 configured as above, when the spool 12 is moved from the neutral position to the right side by driving the electric motor 14, as shown in FIG. 2A, the first spring receiving member 52 is pushed by the first pushing portion 54 which moves together with the spool 12, and with this, the first spring receiving member 52 moves to the right side of the first position P1. On the other hand, the movement of the second spring receiving member 53 to the right side is restricted by the step portion 20g that is the second restricting portion 57, and the second spring receiving member 53 is maintained at the second position P2. With this, a space between the two spring receiving members 52 and 53 narrows, and this compresses the coil spring 51. Thus, the coil spring 51 applies biasing force to the spool 12 through the first spring receiving member 52 and the coupler 40, the biasing force acting in such a direction that the spool 12 returns to the neutral position. To be specific, the coil spring 51 applies to the spool 12 the biasing force acting toward the left side against pushing force generated by driving the electric motor 14.

Further, when the spool 12 is moved from the neutral position to the left side by driving the electric motor 14, as shown in FIG. 2B, the second spring receiving member 53 is pushed by the second pushing portion 55 which moves together with the spool 12, and with this, the second spring receiving member 53 moves to the left side of the second position P2. On the other hand, the movement of the first spring receiving member 52 to the left side is restricted by the step portion 20i that is the first restricting portion 56, and the first spring receiving member 52 is maintained at the first position P1. With this, the space between the two spring receiving members 52 and 53 narrows, and this compresses the coil spring 51. Thus, the coil spring 51 applies biasing force to the spool 12 through the second spring receiving member 52 and the coupler 40, the biasing force acting in such a direction that the spool 12 returns to the neutral position. To be specific, the coil spring 51 applies to the spool 12 the biasing force acting toward the right side against the pushing force generated by driving the electric motor 14.

When the spool 12 is located at the neutral position, the first spring receiving member 52 is supported by the step portion 20i that is the first restricting portion 56, and the second spring receiving member 53 is supported by the step portion 20g that is the second restricting portion 57. Therefore, the biasing force of the coil spring 51 does not act on the spool 12. On this account, by setting the pushing force applied from the electric motor 14 to the spool 12 to zero, the spool 12 can be made to return to the neutral position.

The neutral return mechanism 50 of the present embodiment includes a configuration of limiting a stroke range of the spool 12. In the present embodiment, a radially outer end edge of the second pushing portion 55 is located between the inner peripheral surface 20d and the inner peripheral surface 20e in the radial direction, the inner peripheral surface 20e being smaller in diameter than the inner peripheral surface 20d. Therefore, when the spool 12 moves from the neutral position to the right side by a predetermined distance, the second pushing portion 55 which moves to the right side together with the spool 12 contacts the step portion 20h between the inner peripheral surfaces 20d and 20e, and with this, the movement to the right side is restricted (see FIG. 2A). Further, a radially outer end edge of the first pushing portion 54 is located between the inner peripheral surface 20b and the inner peripheral surface 20a in the radial direction, the inner peripheral surface 20a being smaller in diameter than the inner peripheral surface 20b. Therefore, when the spool 12 moves from the neutral position to the left side by a predetermined distance, the first pushing portion 54 which moves to the left side together with the spool 12 contacts the step portion 20f between the inner peripheral surfaces 20a and 20b, and with this, the movement to the left side is restricted (see FIG. 2B). Thus, the spool 12 is prevented from moving by more than the predetermined distance in the left-right direction.

As described above, in the spool valve 1A according to the present embodiment, the coil spring 51 of the neutral return mechanism 50 is arranged so as to overlap the nut 32 when viewed from the radial direction of the screw shaft 31. Therefore, the length of the spool valve 1A in the axial direction can be made shorter than that of a conventional spool valve in which the coil spring 51 and the nut 32 are lined up in the axial direction.

Further, in the present embodiment, the projecting portion 43 of the coupler 40 connected to the spool 12 projects from the casing 20. Therefore, after the electric motor 14 and the casing 20 accommodating the coil spring 51 and the nut 32 are formed as an assembly, the spool 12 can be attached to the coupler 40.

Further, in the present embodiment, the casing 20 is integrally formed and holds the coil spring 51 therein. Therefore, for example, when replacing the spool 12 with a new spool, the spool valve 1A is easily assembled.

Modified Example

The above embodiment has described an example in which the coil spring 51 is constituted by a single spring piece. However, the coil spring included in the spool valve of the present invention may include a plurality of spring pieces. Hereinafter, the spool valve 1B according to Modified Example of the above embodiment will be described with reference to FIGS. 3, 4A, and 4B as an example in which a coil spring includes a plurality of spring pieces. The configuration of the spool valve 1B according to Modified Example is similar to the configuration of the spool valve 1A of Embodiment 1. Therefore, the following will mainly describe differences from the spool valve 1A of Embodiment 1. The same reference signs are used for the same components, and a repetition of the same explanation is avoided.

Figure 3:
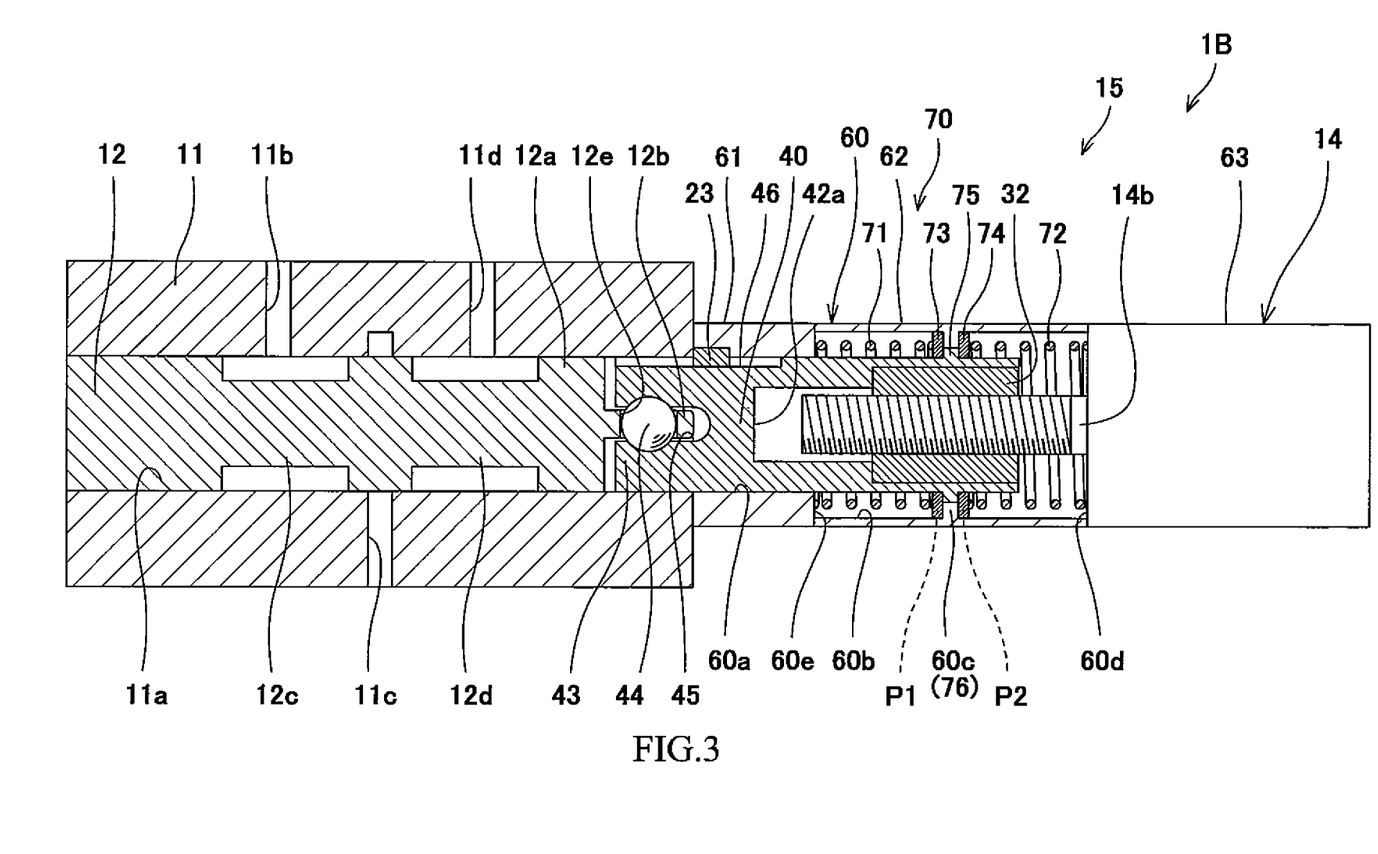
FIG. 3 is a sectional view showing the spool valve according to Modified Example.

Instead of the linear-motion converting unit 13 and the electric motor 14 included in the spool valve 1A of Embodiment 1, the spool valve 1B shown in FIG. 3 includes a motor unit 15 including the electric motor 14. To be specific, the linear-motion converting unit 13 of Embodiment 1 is a unit not including the electric motor 14, but the motor unit 15 is configured as a unit including the electric motor 14.

The motor unit 15 includes the electric motor 14, a casing 60, the linear-motion converting mechanism 30, the coupler 40, and a neutral return mechanism 70.

The casing 60 has a substantially cylindrical shape and includes opening portions at respective right-side and left-side end portions thereof. The casing 60 includes a first casing piece 61, a second casing piece 62, and a third casing piece 63 which are formed by dividing the casing 60 in the axial direction at sections perpendicular to the axial direction of the spool 12. The first casing piece 61, the second casing piece 62, and the third casing piece 63 are lined up in the axial direction of the spool 12 in this order from a side close to the spool 12 and are coupled to each other. The first casing piece 61 has a substantially cylindrical shape and includes an inner peripheral surface 60a that is equal in diameter to the spool hole 11a. The second casing piece 62 has a substantially cylindrical shape and includes an inner peripheral surface 60b that is larger in diameter than the inner peripheral surface 60a of the first casing piece 61. A projecting portion 60c is formed in the vicinity of a middle of the inner peripheral surface 60b in the axial direction. The projecting portion 60c projects inward in the radial direction from the inner peripheral surface 60b over the entire periphery. The third casing piece 63 is a casing piece covering the stator 14a of the electric motor 14 and includes at least an end surface 60d at the left side. An opening portion through which the rotor 14b is inserted is formed on the end surface 60d.

The first casing piece 61 and the second casing piece 62 are integrally formed in such a manner that a right-side opening end portion of the first casing piece 61 and a left-side opening end portion of the second casing piece 62 are made to face each other and are joined to each other by mechanical fastening, welding, adhesion, or the like. Further, the second casing piece 62 and the third casing piece 63 are integrally formed in such a manner that a right-side opening end portion of the second casing piece 62 and the end surface 60d of the third casing piece 63 are made to face each other and are joined to each other by mechanical fastening, welding, adhesion, or the like. Thus, the casing 60 is integrally formed by joining the adjacent casing pieces that are the first casing piece 61, the second casing piece 62, and the third casing piece 63 to each other. To be specific, the motor unit 15 is configured as a single unit by integrally forming the casing 60 such that components of the linear-motion converting mechanism 30 and components of the neutral return mechanism 70 are held inside the casing 60. It should be noted that by joining the first casing piece 61 and the second casing piece 62 to each other, a step portion 60e is formed between the inner peripheral surfaces 60a and 60b in the casing 60.

The neutral return mechanism 70 is configured such that a coil spring which applies the biasing force to the spool 12 includes a first spring piece 71 and a second spring piece 72. The first spring piece 71 and the second spring piece 72 are spring pieces which are lined up in the axial direction of the spool 12 and are the same in wire diameter and number of turns as each other. The first spring piece 71 and the second spring piece 72 are compression coil springs. The diameters of the first spring piece 71 and the second spring piece 72 are larger than the diameter of the inner peripheral surface 60a and smaller than the diameter of the inner peripheral surface 60b. The first spring piece 71 is arranged at the left side of the projecting portion 60c of the casing 60, and the second spring piece 72 is arranged at the right side of the projecting portion 60c of the casing 60.

The neutral return mechanism 70 further includes a first spring receiving member 73, a second spring receiving member 74, a pushing portion 75, and a restricting portion 76. The first spring piece 71, the second spring piece 72, the first spring receiving member 73, and the second spring receiving member 74 are externally attached to the coupler 40.

Figure 4A:
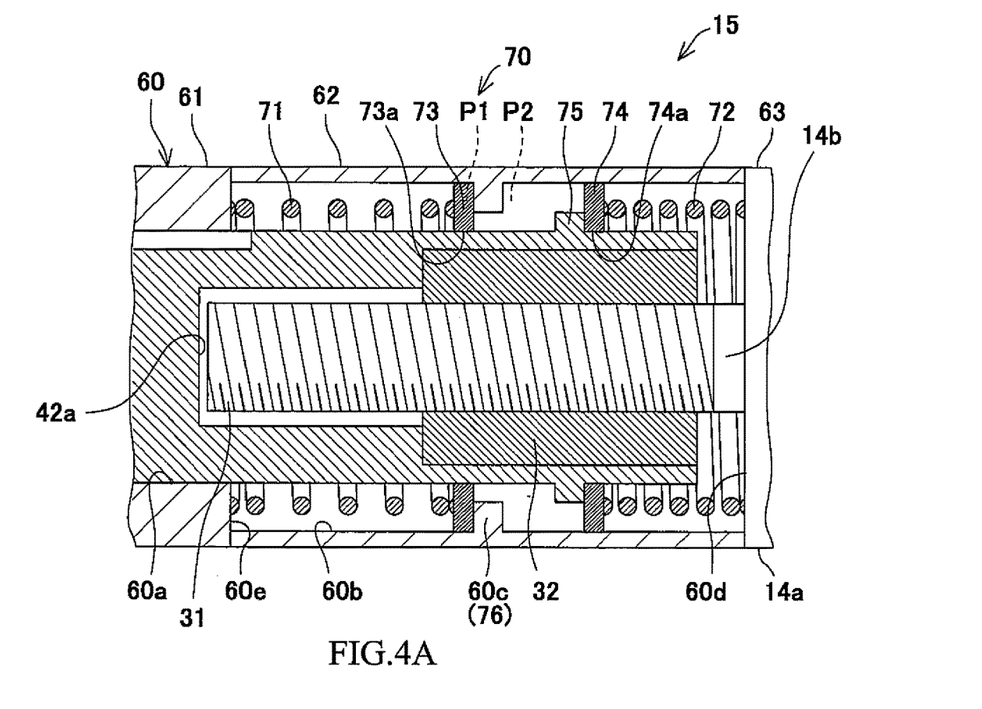
FIG. 4A is an enlarged sectional view showing the neutral return mechanism of the spool valve shown in FIG. 3 and is a diagram showing that the spool has moved to the first side in the axial direction.
Figure 4B:
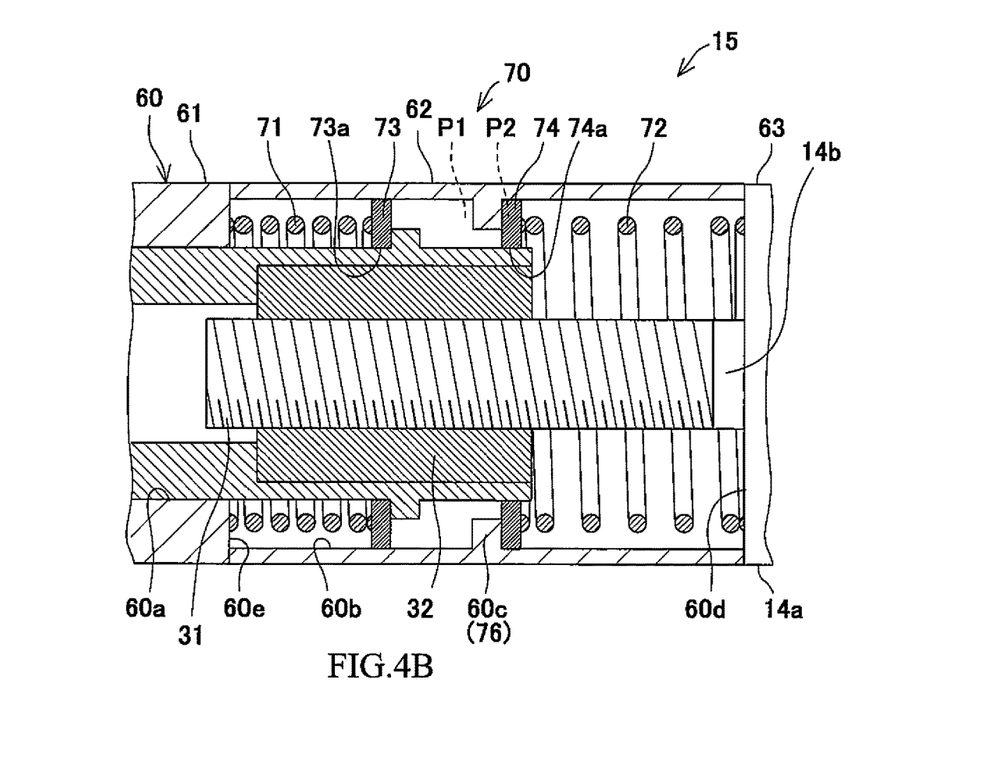
FIG. 4B is an enlarged sectional view showing the neutral return mechanism of the spool valve shown in FIG. 3 and is a diagram showing that the spool has moved to the second side in the axial direction.

FIG. 4A is an enlarged sectional view showing a state of the neutral return mechanism 70 when the spool 12 has moved to the right side. FIG. 4B is an enlarged sectional view showing a state of the neutral return mechanism 70 when the spool 12 has moved to the left side. Hereinafter, the neutral return mechanism 70 will be described suitably with reference to FIGS. 4A and 4B.

The first spring piece 71 and the second spring piece 72 are arranged around the coupler 40 (more specifically, the tubular portion 41) so as to overlap the nut 32 when viewed from the radial direction of the screw shaft 31. To be specific, in the present embodiment, as with Embodiment 1, the linear-motion converting mechanism 30 is arranged at a radially inner side of the tubular portion 41 of the coupler 40, and the neutral return mechanism 70 is arranged at a radially outer side of the tubular portion 41 of the coupler 40.

The first spring receiving member 73 is formed in a substantially circular plate shape and includes an insertion hole 73a into which the coupler 40 is inserted in its axial direction, and the second spring receiving member 74 is formed in a substantially circular plate shape and includes an insertion hole 74a into which the coupler 40 is inserted in its axial direction. The coupler 40 is inserted into the insertion hole 73a of the first spring receiving member 73 and the insertion hole 74a of the second spring receiving member 74, and with this, the first spring receiving member 73 and the second spring receiving member 74 are movable (slidable) relative to the coupler 40 in the axial direction. The first spring piece 71 is interposed between the first spring receiving member 73 and the step portion 60e of the first casing piece 61 in a compressed state. Further, the second spring piece 72 is interposed between the second spring receiving member 74 and the end surface 60d of the third casing piece 63 in a compressed state. As shown in FIG. 3, when the spool 12 is located at the neutral position, the first spring receiving member 73 is located at the first position P1 in the casing 60, and the second spring receiving member 74 is located at the second position P2 in the casing 60.

The pushing portion 75 is provided so as to project outward in the radial direction from a surface of the coupler 40 on which surface the spring receiving members 73 and 74 slide. The pushing portion 75 is a part of the coupler 40 and moves integrally with the coupler 40 in the axial direction. The restricting portion 76 is the above-described projecting portion 60c and restricts the movement of the first spring receiving member 73 to the right side and the movement of the second spring receiving member 74 to the left side.

The pushing portion 75 and the restricting portion 76 are the same in thickness in the axial direction as each other. When the spool 12 is located at the neutral position, the pushing portion 75 and the restricting portion 76 are opposed to each other in the radial direction. Further, a radially outer end edge of the pushing portion 75 and a radially inner end edge of the restricting portion 76 are located between the inner peripheral surface 60b and the inner peripheral surface 60a in the radial direction, the inner peripheral surface 60a being smaller in diameter than the inner peripheral surface 60b. When the spool 12 is located at the neutral position, the first spring receiving member 73 at the first position contacts and is supported by the pushing portion 75 and the restricting portion 76 at the right side, and the second spring receiving member 74 at the second position contacts and is supported by the pushing portion 75 and the restricting portion 76 at the left side.

In the neutral return mechanism 70 configured as above, when the spool 12 is moved from the neutral position to the right side by driving the electric motor 14, as shown in FIG. 4A, the first spring receiving member 73 is maintained at the first position P1, but the second spring receiving member 74 is pushed by the pushing portion 75 which moves together with the spool 12, and with this, the second spring receiving member 74 moves to the right side of the second position P2. With this, a space between the second spring receiving member 74 and the end surface 60d of the third casing piece 63 narrows, and this compresses the second spring piece 72. Thus, the second spring piece 72 applies biasing force to the spool 12 through the second spring receiving member 74 and the coupler 40, the biasing force acting in such a direction that the spool 12 returns to the neutral position. To be specific, the second spring piece 72 applies to the spool 12 the biasing force acting toward the left side against the pushing force generated by driving the electric motor 14.

Further, when the spool 12 is moved from the neutral position to the left side by driving the electric motor 14, as shown in FIG. 4B, the second spring receiving member 74 is maintained at the second position P2, but the first spring receiving member 73 is pushed by the pushing portion 75 which moves together with the spool 12, and with this, the first spring receiving member 73 moves to the left side of the first position P1. With this, a space between the first spring receiving member 73 and the step portion 60e of the first casing piece 61 narrows, and this compresses the first spring piece 71. Thus, the first spring piece 71 applies biasing force to the spool 12 through the first spring receiving member 73 and the coupler 40, the biasing force acting in such a direction that the spool 12 returns to the neutral position. To be specific, the first spring piece 71 applies to the spool 12 the biasing force acting toward the right side against the pushing force generated by driving the electric motor 14.

In the present modified example, when the spool 12 moves from the neutral position, one of the first spring piece 71 and the second spring piece 72 is compressed. Therefore, durability of each spring piece can be improved.

In the spool valve 1B according to the present modified example, the coil spring 51 of the neutral return mechanism 70 is arranged so as to overlap the nut 32 when viewed from the radial direction of the screw shaft 31. Therefore, the length of the spool 12 in the axial direction can be made shorter than that of a conventional spool valve in which the coil spring 51 and the nut 32 are lined up in the axial direction. It should be noted that since it is unnecessary to arrange the two spring pieces such that the two spring pieces are lined up in the axial direction in the spool valve 1A of Embodiment 1, the length in the axial direction in Embodiment 1 can be made shorter than that in the present modified example. In the present modified example, both the first spring piece 71 and the second spring piece 72 are arranged so as to overlap the nut 32 when viewed from the radial direction of the screw shaft 31. However, the present invention is not limited to this. To be specific, at least one of the first spring piece 71 and the second spring piece 72 is only required to be arranged so as to overlap the nut 32 when viewed from the radial direction of the screw shaft 31.

Other Embodiments

The present invention is not limited to the above embodiment and modified example, and various modifications may be made within the scope of the present invention.

For example, in the above embodiment and modified example, the coupler 40 includes the projecting portion 43 projecting from the casing 20 (60), and the projecting portion 43 is inserted into the spool hole 11a of the housing 11. However, the coupler 40 does not have to project from the casing 20 (60). For example, the spool 12 may include a projecting portion projecting from the housing 11, and this projecting portion may enter into the casing 20 (60). However, when the coupler 40 includes the projecting portion 43 as in the above embodiment and modified example, the electric motor and the casing accommodating the coil spring 51 and the nut are formed as an assembly, and then, the coupler 40 can be attached to the spool 12. Therefore, this is especially useful when, for example, replacing only the spool 12.

Further, in the above embodiment, in order to limit the stroke range of the spool 12, the second pushing portion 55 contacts the step portion 20h when the spool 12 has moved from the neutral position to the right side by a predetermined distance, and the first pushing portion 54 contacts the step portion 20f when the spool 12 has moved from the neutral position to the left side by a predetermined distance. However, the configuration of limiting the stroke range of the spool 12 is not limited to this.

For example, one or both of the length of the tubular portion 52b in the axial direction and the length of the tubular portion 53b in the axial direction may be increased. With this, when the first spring receiving member 52 or the second spring receiving member 53 moves, a gap between the tubular portion 52b and the tubular portion 53b disappears (the tubular portion 52b and the tubular portion 53b contact each other), and with this, movement distances of the first spring receiving member 52 and the second spring receiving member 53 can be limited. As above, since the movement distances of the first spring receiving member 52 and the second spring receiving member 53 are limited, this can limit the stroke range of the spool 12.

Or, for example, a tubular body externally attached to the coupler 40 is provided between the tubular portion 52b and the tubular portion 53b. By setting the length of the tubular body in the axial direction to an appropriate length, the tubular body is sandwiched between the tubular portion 52b and the tubular portion 53b in the axial direction when the first spring receiving member 52 or the second spring receiving member 53 moves. With this, the movement distances of the first spring receiving member 52 and the second spring receiving member 53 are limited, and this can limit the stroke range of the spool 12.

The above configuration of limiting the stroke range of the spool 12 by providing the tubular body externally attached to the coupler 40 is especially useful since this configuration is applicable to spool valves having different stroke regions only by changing the length of the tubular body in the axial direction without changing the sizes and the like of the other members.

In the above embodiment, the coupler 40 and the spool 12 are connected to each other through the ball 44. However, a connection configuration between the coupler 40 and the spool 12 is not limited to this. For example, a universal joint may be adopted as the connection configuration between the coupler 40 and the spool 12. Further, for example, the coupler 40 and the spool 12 may be connected to each other in such a manner that a screw portion extending in the axial direction is formed at one end portion of the coupler 40, and the screw portion is inserted into a screw hole formed at one end portion of the spool 12.

Further, the spool main body portion 12a and the flat plate portion 12b projecting from one end portion of the spool main body portion 12a are integrally formed in the above embodiment but may be formed separately. Further, in the coupler 40, the tubular portion 41 to which the nut 32 is fitted and the projecting portion 43 formed so as to be connectable with the spool 12 are integrally formed. However, the coupler 40 may be configured by coupling a plurality of members to each other. For example, the tubular portion 41 and the projecting portion 43 may be formed separately. Further, the first pushing portion 54 is formed separately from the coupler 40 but may be formed integrally with the coupler 40. Furthermore, the second pushing portion 55 and the pushing portion 75 are formed integrally with the coupler 40 but may be formed separately. The first restricting portion 56, the second restricting portion 57, and the restricting portion 76 are formed integrally with the casing 20 but may be formed separately.

In the above description, the spool valve 1A including the coil spring 51 constituted by a single spring piece includes the linear-motion converting unit 13 not including the electric motor 14, and the spool valve 1B including the first spring piece 71 and the second spring piece 72 as the coil spring includes the motor unit 15 including the electric motor 14. However, the present invention is not limited to these. To be specific, the spool valve including a single spring piece as the coil spring of the neutral return mechanism may be configured to include the motor unit, and the spool valve including a plurality of spring pieces as the coil spring of the neutral return mechanism may be configured to include the linear-motion converting unit.

Further, in the spool valve 1A according to Embodiment 1 and the spool valve 1B according to Modified Example, the linear-motion converting mechanism 30 is directly coupled to the rotor 14b. However, the rotor 14b and the linear-motion converting mechanism 30 may be connected to each other through, for example, a transmission mechanism. In this case, the electric motor 14 is not arranged coaxially with the linear-motion converting mechanism 30, and the electric motor 14 may be arranged side by side with the linear-motion converting mechanism 30. Further, the linear-motion converting mechanism 30 does not have to be a ball screw mechanism. For example, the linear-motion converting mechanism 30 may be a sliding screw mechanism, a trapezoidal screw mechanism, or the like.

REFERENCE SIGNS LIST 1A, 1B spool valve
11 housing
12 spool
14 electric motor
20, 60 casing
31 screw shaft
32 nut
40 coupler
51 coil spring
71 first spring piece
72 second spring piece

The invention claimed is:
1. A spool valve comprising:
a housing including a spool hole;
a spool inserted into the spool hole of the housing so as to be movable in an axial direction;
a screw shaft arranged coaxially with the spool;
an electric motor configured to rotate the screw shaft;
a nut threadedly engaged with the screw shaft and configured to move in the axial direction when the screw shaft is rotated;
a coupler including a tubular portion to which the nut is fitted, the nut and the spool being coupled to each other by the coupler; and
a coil spring configured to apply a biasing force to the spool, the biasing force maintaining the spool at a neutral position, the coil spring being arranged around the tubular portion so as to overlap the nut when viewed from a radial direction of the screw shaft.

2. The spool valve according to claim 1, further comprising a casing accommodating the coil spring and the nut, wherein
the coupler includes a projecting portion projecting from the casing and connected to the spool.

3. The spool valve according to claim 2, wherein the casing is integrally formed, the casing being configured to hold the coil spring in the casing.

4. The spool valve according to claim 3, wherein:
the coil spring includes a first spring piece and a second spring piece;
the first spring piece is compressed when the spool moves from the neutral position to a first side in the axial direction; and
the second spring piece is compressed when the spool moves from the neutral position to a second side in the axial direction.

5. The spool valve according to claim 3, wherein the coil spring is compressed when the spool moves from the neutral position to each of a first side and a second side in the axial direction.

6. The spool valve according to claim 2, wherein:
the coil spring includes a first spring piece and a second spring piece;
the first spring piece is compressed when the spool moves from the neutral position to a first side in the axial direction; and
the second spring piece is compressed when the spool moves from the neutral position to a second side in the axial direction.

7. The spool valve according to claim 2, wherein the coil spring is compressed when the spool moves from the neutral position to each of a first side and a second side in the axial direction.

8. The spool valve according to claim 1, wherein:
the coil spring includes a first spring piece and a second spring piece;
the first spring piece is compressed when the spool moves from the neutral position to a first side in the axial direction; and
the second spring piece is compressed when the spool moves from the neutral position to a second side in the axial direction.

9. The spool valve according to claim 1, wherein the coil spring is compressed when the spool moves from the neutral position to each of a first side and a second side in the axial direction.

10. A spool valve comprising: a housing including a spool hole; a spool inserted into the spool hole of the housing so as to be movable in an axial direction; a screw shaft arranged coaxially with the spool; an electric motor configured to rotate the screw shaft; a nut threadedly engaged with the screw shaft, the nut being configured to move in the axial direction when the screw shaft is rotated; a coupler through which the nut and the spool are coupled to each other, the coupler including a projecting portion projecting from a casing and connected to the spool; a coil spring configured to apply a biasing force to the spool, the biasing force maintaining the spool at a neutral position, the coil spring being arranged so as to overlap the nut when viewed from a radial direction of the screw shaft; and the casing accommodating the coil spring and the nut.

11. The spool valve according to claim 10, wherein the casing is integrally formed, the casing being configured to hold the coil spring in the casing.

12. The spool valve according to claim 10, wherein:
the coil spring includes a first spring piece and a second spring piece;
the first spring piece is compressed when the spool moves from the neutral position to a first side in the axial direction; and
the second spring piece is compressed when the spool moves from the neutral position to a second side in the axial direction.

13. The spool valve according to claim 10, wherein the coil spring is compressed when the spool moves from the neutral position to each of a first side and a second side in the axial direction.

* * * * *